United States Patent [19]

Freeman

[11] Patent Number: 4,688,133

[45] Date of Patent: Aug. 18, 1987

[54] ELECTRONIC DETECTION CIRCUIT FOR A GROUND FAULT CIRCUIT INTERRUPTER

[75] Inventor: LeRoy M. Freeman, Westbury, N.Y.

[73] Assignee: Slater Electric Inc., Glen Cove, N.Y.

[21] Appl. No.: 690,161

[22] Filed: Jan. 10, 1985

[51] Int. Cl.⁴ .............................................. H02H 3/16
[52] U.S. Cl. ......................................... 361/45; 361/42
[58] Field of Search ....................... 361/42, 45, 46, 54; 323/242, 326; 307/252 J, 252 UA, 252 W, 252 N

[56] References Cited

U.S. PATENT DOCUMENTS 3,973,171 8/1976 Howell .................................. 361/45

Primary Examiner—A. D. Pellinen
Assistant Examiner—Jeffrey A. Gaffin
Attorney, Agent, or Firm—Morgan & Finnegan

[57] ABSTRACT

In a ground fault circuit interrupter having a solenoid with a moveable core, an electronic circuit detects a fault. The detection circuit also inhibits the solenoid from opening a pair of latching contacts until there is sufficient electrical energy to insure that the kinetic energy of the solenoid will cause the contacts to latch open.

7 Claims, 7 Drawing Figures

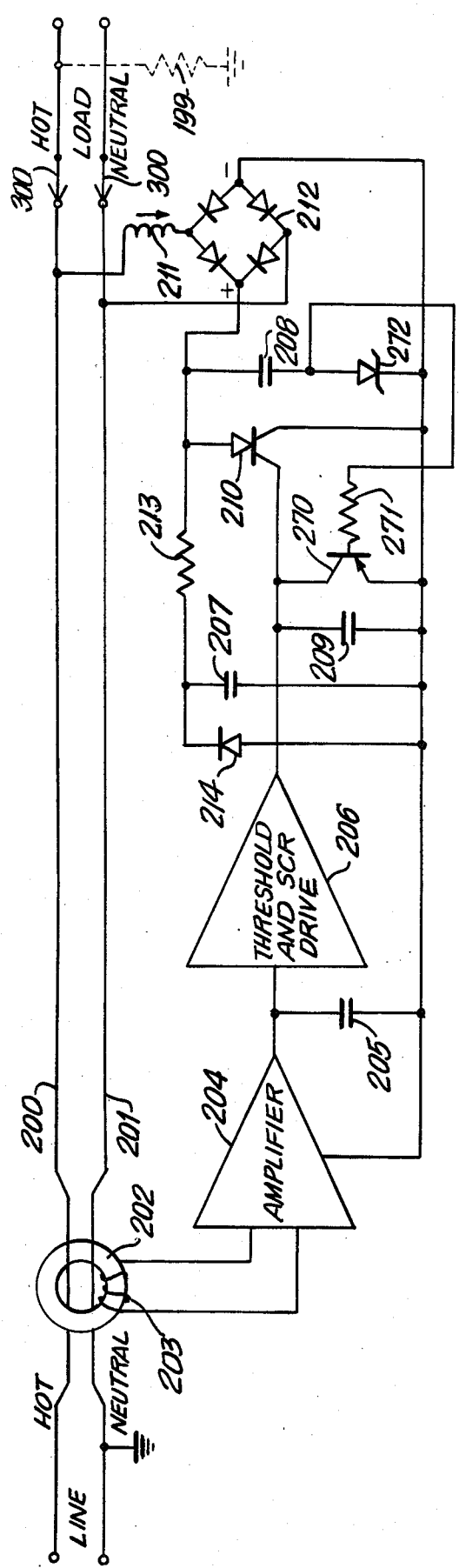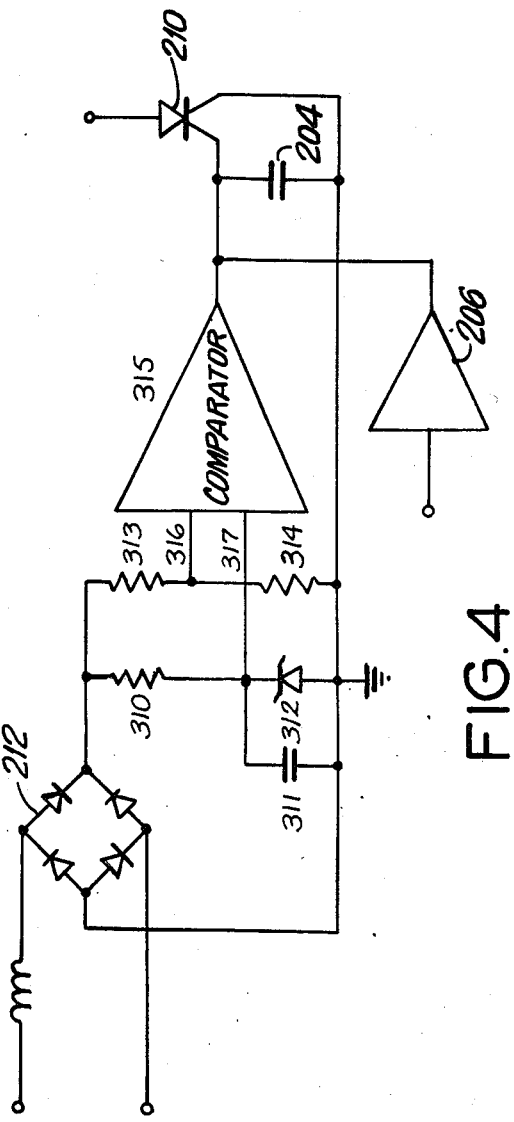
FIG. 3
FIG. 4

ELECTRONIC DETECTION CIRCUIT FOR A GROUND FAULT CIRCUIT INTERRUPTER

BACKGROUND OF THE INVENTION

1. Field of the Invention

The apparatus of the present invention relates to electrical power distribution systems, and more specifically to a detection circuit for a ground fault circuit interrupter, having a solenoid with a moveable core.

2. Description of the Prior Art

Ground fault circuit interrupters (GFCI) are devices which can be mounted in standard electrical receptacle boxes, which can be incorporated into circuit breakers, or which can be portable stand alone units. GFCI's are useful for quickly interrupting the flow of current when a fault occurs. The ground fault circuit interrupter is typically comprised of an electronic circuit for detecting the electrical fault and an electromechanical current interrupter. When the cause of the fault has been corrected, the ground fault circuit interrupter can be reset by depressing a reset button disposed on the face of the ground fault interrupter. A representative example of such a device is described in U.S. Pat. No. 3,813,579 by Doyle et al., issued on May 28, 1974.

There are several patents which disclose ground fault circuit interrupters, The electromechanical current interrupter of these devices, however, can be characterized as an electro-mechanical device utilizing either a moving core and helical coil as the power element or as an electromechanical device utilizing a fixed core, helical coil and an armature as the power element. A typical example of a ground fault circuit interrupter device having a moving core which opens spring actuated contacts is disclosed in U.S. Pat. No. 4,247,840 Cooper et al., issued Jan. 21, 1981 and assigned to GTE. A typical example of a ground fault interrupter device having a fixed core which opens spring actuated contacts is disclosed in U.S. Pat. No. 4,086,549, issued Apr. 25, 1978, and assigned to assignee of the present invention.

Copending U.S. patent application Ser. No. 690,160, filed Jan. 10, 1985, and also assigned to the assignee of the present invention discloses a ground fault circuit interrupter of the type having a solenoid with a moving core that does not require the assistance of springs to separate a pair of contacts. The ground fault circuit interrupter includes two pivot arms or cam actuators which are coupled together by a catcher and which rotate when the moveable core displaces the catcher. As the cam actuators rotate, they cause a pair of flexure arms having moveable contacts disposed thereon to deflect. The deflection of the flexure arms causes an opening between stationary contacts and the moveable contacts on each of the flexure arms. The solenoid is energized and the contacts are opened when an electronic circuit detects a fault in the conducting wires connected to the ground fault circuit interrupter. In a conventional ground fault circuit interrupter detection circuit, a circuit integrator is used to activate the moving core of the solenoid. In some instances, such as in the case of the above described copending patent application Ser. No. 690,160, the charging of the integrator to the threshold causes a thyristor to fire to energize the solenoid core. For a low level trip fault current, the charging may occur towards the end of the power line cycle during a low energy interval. Therefore, the current interrupter may not latch open in this interval, thereby allowing the unlatched contacts to close again. Under certain circumstances, this condition can cause the solenoid to fire multiple times before the contacts finally latch open.

Accordingly, there is a need for an improved electronic detection circuit for a ground fault interrupter having a solenoid with a moveable core.

SUMMARY OF THE INVENTION

The apparatus of the present invention provides an improved electronic detection circuit for a ground fault circuit interrupter having a solenoid with a moveable core. The electronic detection circuit includes a transformer for detecting a fault in the power lines connected to the ground fault, circuit interrupter. This fault which causes an imbalance in the power lines, produces a signal that is amplified and applied to a threshold circuit and silicon controlled rectifier drive. The SCR controls the current through a bridge rectifier connected to the solenoid, such that when the SCR fires the solenoid is activated and a pair of contacts open to interrupt the current in the power lines. The operation of the SCR, however, is inhibited near the end of a cycle associated with the output of the bridge rectifier, such that the solenoid is not actuated if there is insufficient electrical energy in that cycle to cause the contacts to latch open. Upon the occurrence of the next cycle, the SCR will fire and the actuated solenoid will cause the contacts to latch in the open position. This arrangement prevents the solenoid from only partially opening the contacts.

BRIEF DESCRIPTION OF THE DRAWINGS

FIG. 3 is a schematic diagram of the apparatus of the present invention;

FIG. 4 is a schematic diagram of a circuit providing a fixed threshold for inhibiting the SCR 210 in accordance with the teachings of the present invention;

DETAILED DESCRIPTION OF THE INVENTION

Figure 1:
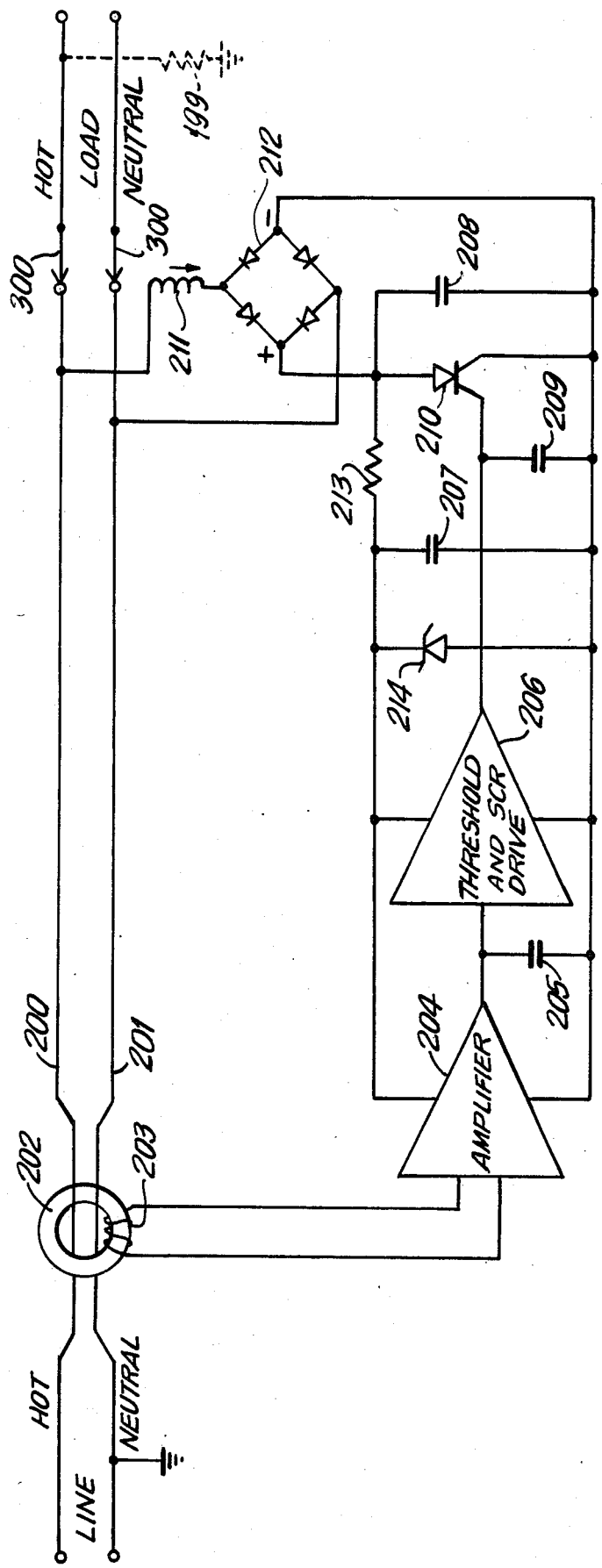
FIG. 1 is a simplified schematic diagram of a conventional detection circuit for a ground fault circuit interrupter.

Referring now to FIG. 1, the simplified ground fault circuit interrupter (GFCI) diagram indicates some of the potential features of a common type configuration. A representative example of such a ground fault circuit interrupter detection circuit is described in U.S. Pat. No. 3,936,699 entitled "Ground Fault Protective Circuitry", issued Feb. 3, 1976, and assigned to Pass & Seymour, Inc.

The power line leads 200, 201 feed through the center core 202 of a transformer. When there is no fault condition, the currents in power lines 200, 201 are equal and opposite, generating a net zero field and therefore a theoretical net zero voltage across the secondary winding 203 of the transformer. When a fault occurs some of the current from the power line 200 is diverted to ground such that the currents in power lines 200, 201 are unequal. This grounding of power line 200 is represented in phantom by the resistor 199. The difference in these currents is picked up by the secondary winding 203 of the transformer, amplified by the amplifier 204, and causes an integrating capacitor 205 to charge. If the fault current is sufficient, the capacitor 205 will charge to a level greater than the threshold level of a threshold and SCR drive circuit 206 and turn on SCR 210. The threshold and SCR drive circuit 206 as well as amplifier 204 may be an integrated circuit of the type manufactured and sold by National Semiconductor under the device number LM-1851. The SCR 210 operates the relay or solenoid coil 211 through the bridge rectifier 212 to open the load contacts 300, thereby removing power from the load and the fault. When the fault current is no longer present capacitor 205 discharges and the SCR 210 no longer fires. The bridge rectifier 212 supplies positive power to the SCR 210 for both polarities of line voltage so that the SCR 210 can fire for either polarity. The capacitor 208 helps inhibit line transients and surges from adversely affecting the other electronic components. Resistor 213 drops the line voltage from line levels to IC levels. The IC power supply voltage is filtered by capacitor 207 and regulated by zener diode 214 which may also be part of the integrated circuit. The capacitor 209 is utilized to suppress high frequency noise spikes which otherwise might cause false tripping.

As has been noted, the moveable core of solenoid 211 utilizes kinetic energy to open the main contacts 300. This arrangement can introduce an operating problem. If a low level fault current occurs the electronic circuit integrator or capacitor 205 charges relatively slowly, resulting in the firing of the SCR 210 and activation of the moving core of the solenoid 211 near the end of a sinusoidal cycle of the power line. Once fired, the SCR 210 stays on until the zero crossing of the line cycle current. If the firing occurs too near the end of a cycle, there is insufficient time and energy to open the switch contacts 300 far enough to reach their mechanical latching condition. Once the contacts 300 do start to open, however, the fault condition is removed and the integrating capacitor 205 discharges to a point below the SCR 210 firing condition. When mechanically unlatched contacts 300 close again the fault is applied again and the integrating capacitor 205 starts to charge again. Under the right circumstances, this condition can cause the device to fire multiple times before the contacts 300 finally latch open. While this sequence is not necessarily dangerous, since the contacts are open much of the time, it can be quite annoying.

In another situation, if a fault occurs very near the end of a power line cycle the moving core of solenoid 211 can move to and touch the opening mechanism (not shown) without mechanically opening the contacts 300, thereby not removing the fault. Without the apparatus of the present invention, the conventional electronics of FIG. 1 would hold the gate of the SCR 210 at a firing potential for a short time period so that immediately on the next half cycle the SCR 210 would refire. The moving core of solenoid 211 having been in contact with the opening mechanism, and not having sufficient time before the refiring of the SCR 210 to move back to its initial position, would not have sufficient kinetic energy to latch the contacts 300 open. However, the moving core of solenoid 211 can still temporarily open the contacts 300, without latching them open, thereby removing the fault and allowing the integrating capacitor 205 to discharge to below the SCR 210 firing level. The core of solenoid 211 can then return to its initial position and work properly on the next cycle. This condition can slightly slow down the time from fault initiation to the final latching open of the contacts 300. The time the contacts 300 are actually closed during this total sequence would still be short enough to maintain the required specifications for safety.

To overcome these problems, however, the SCR 210 can be inhibited from firing near the end of a power cycle. The inhibiting can be accomplished by turning on a switching device near the end of a cycle which effectively shorts the SCR 210 gate-to-cathode terminals. A fault occurring after the short is applied cannot turn on the SCR 210 for the remainder of the sinusoidal power line cycle (or fullwave rectified bridge output cycle).

There are numerous techniques to perform this task of inhibiting a thyristor from firing for a portion of a line cycle, such as utilizing the power line voltage amplitude, or zero crossing or peak voltage point as a reference. These techniques will now be explained in conjunction with the waveforms provided in FIG. 2. The first technique may employ the voltage amplitude information, such that the firing semiconductor or SCR 210 can be inhibited whenever the line voltage was below a certain level. i.e., the firing start could only occur around the peak amplitude. That is, firing could start any place in area V, when the instantaneous voltage of the line is greater than a selected threshold, and continue through area W. Firing could not start, in either area U or W, when the line voltage is below the threshold. Of course, the device would not fire without a fault, regardless of line voltage amplitude.

If a fixed threshold is compared to a varying line RMS voltage the inhibit point will move. For a nominal line voltage illustrated in FIG. 2, the input threshold limits occur at points 250 and 251. For a high line voltage the points would move to 252 and 253. If the firing occurs at point 253, the SCR 210 pulse energy content would actually decrease, from that obtained at nominal line voltage, since the firing duration decreases and the instantaneous amplitude at firing point 253 is still the same as at point 251 for the nominal line, i.e. equal to the fixed threshold voltage. Typical examples of circuits which would provide a fixed threshold for inhibiting the SCR 210 are provided in FIGS. 4 and 5.

Figure 2:
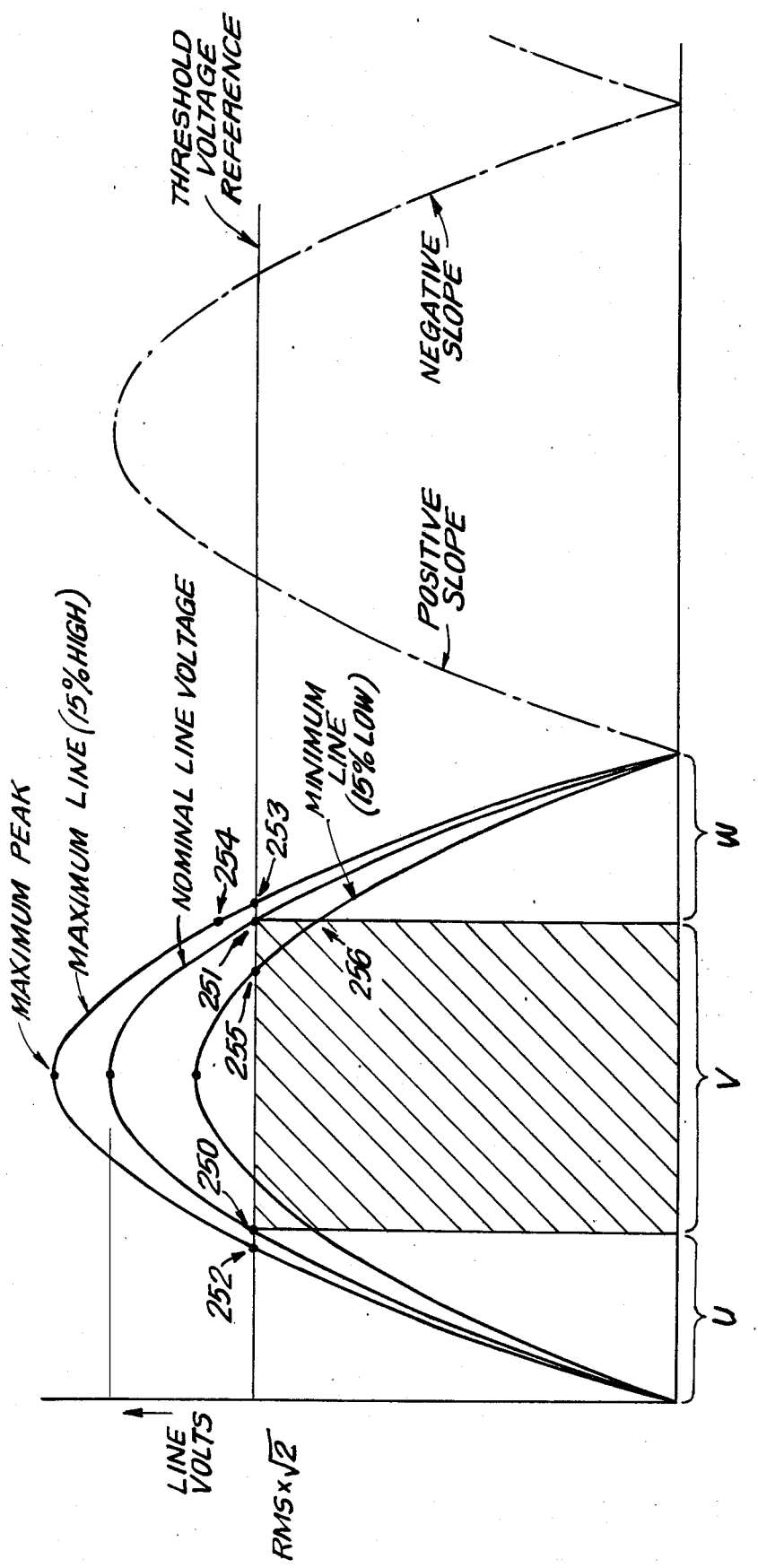
FIG. 2 is a waveform diagram of voltages associated with the apparatus of the present invention.

Referring now to FIG. 4, the full wave rectified output of bridge 212 (as shown in FIG. 2) is passed through resistor 310 to capacitor 311 and zener diode 312. The capacitor 311 filters the waveform to remove the valleys of the waveform between the negative slope and the positive slope (see FIG. 2). The zener diode 312 clips the remaining waveform providing a regulated DC reference voltage at the input 317 to a comparator 315. The other input 316 to comparator 315 is from bridge 212 output via resistor divider 313 and 314. With a fixed zener voltage, resistor 313 or 314 can be changed to adjust the level of the output voltage to the level of the bridge 212 at which input 316 is equal to input 317 and the comparator 315 switches to a high level. This might be set to occur, for example, at point 250 of FIG. 2 and keep the comparator output high from point 250 to point 251 and low for intervals U and W. The low outputs of most comparators, such as the LM 311, flow through the collector and into the grounded emitter of a saturated NPN transistor. The grounding output transistor of the comparator 315, when it is on, therefore sinks any positive output from the SCR drive circuit 206. By the same token, the output of an SCR drive circuit such as that of the LM 1851 provides a positive current when it is on and a saturated to ground NPN transistor when it is low. This transistor in a similar fashion, when it is saturated, absorbs any positive output of the comparator 315. The SCR drive circuit 206 and the comparator 315 therefore function as a type of "AND" circuit. Before the SCR 210 can be triggered, both a ground fault must occur which attemps to put the output of 206 to a positive level, and the compartor must be in a high level output state, such as during time interval V of FIG. 2. If for some reason the SCR 210 were required to be exhibited during the V period instead of the U and W period, the leads 316 and 317 to the comparator 315 need only be reversed. Since the voltage across the zener at 317 is fixed, but the amplitude at 316 is proportional to line voltage, the relative comparator switching point and therefore the SCR inhibit point will vary with line voltage as previously described (starting on page 8, line 9).

Figure 5:
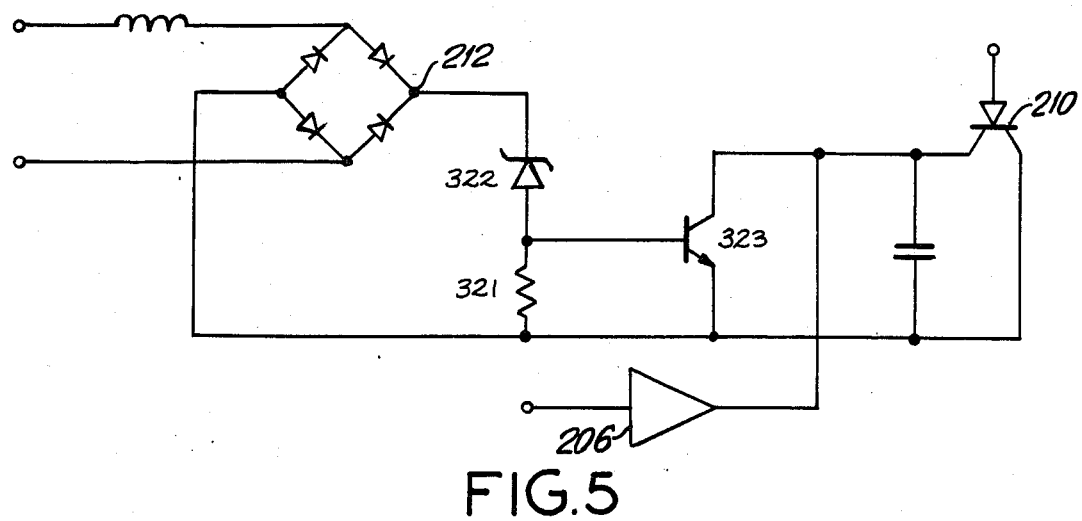
FIG. 5 is a schematic diagram of a circuit providing a fixed threshold for inhibiting the SCR 210 in accordance with the teachings of the present invention.

FIG. 5 is a simpler version of FIG. 4 and can be used to inhibit the SCR 210 from a triggering during the V period of FIG. 2. The NPN transistor 323 functions in the manner of a comparator, comparing the base voltage to the emitter voltage. The transistor turns on to absorb any potential output of 206 and thereby inhibit SCR 210 when the amplitude of the bridge output 212 is more than the breakdown voltage of the zener diode 322 plus the base to emitter voltage of the NPN transistor 323. In this case, the SCR driver does not have to absorb current from 323 since 323 has no positive power source of its own.

Another technique of the present invention utilizes a threshold proportional to the line voltage rather than a fixed threshold. At maximum line voltage the variable threshold moves up so that point 254 of FIG. 2 is the new inhibit point. This occurs at a higher line voltage, say at point 254 and earlier in the cycle than point 253. The energy remaining in the cycle is greater at point 254 than at point 253. The circuit of FIG. 6 is one possible implementation of a circuit which provides a proportional threshold inhibit.

Figure 6:
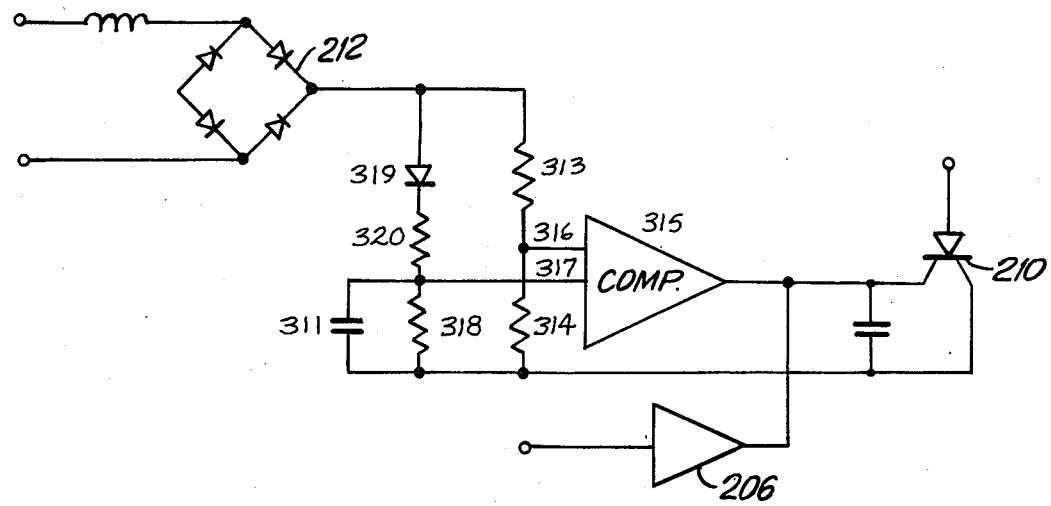
FIG. 6 is a schematic diagram of a circuit for implementing the practice of the present invention.

In FIG. 6, rectifier 319 and capacitor 311 filter the output to provide a DC voltage at 317 which is proportional to the resistive voltage divider 318 and 320 and to the amplitude of the line voltage or the bridge 212 output voltage.

In FIG. 2, therefore, as the line voltage increases the "Threshold Reference Voltage" at 317 also increases. Since both inputs of the comparator are changing in the same direction, the initiation and the end of the SCR inhibit voltage from the comparator would tend to stay at the same phase or the same interval after the line voltage zero crossings. This would tend to increase the worst case minimum time available for the SCR to fire before turning off at its zero current crossing. That is, for example, the inhibit would tend to stay at the time represented by 251 in FIG. 2, rather than shifting left or right in the cycle to points 255 or 253 of FIG. 2. The interaction of the SCR drive circuit 206 and the comparator circuit 315 with the SCR 210 have already been described in conjunction with the functions of FIG. 4.

Numerous other techniques, not described herein, exist for using a zero crossing point or peak amplitude point as a reference to generate a time signal which would allow the SCR 210 to fire through a fixed part of the cycle so as to provide a sufficient energy level. Such an energy level causes one firing of the moveable core of solenoid 211 to drive the opening mechanism to its latched open position.

Figure 7:
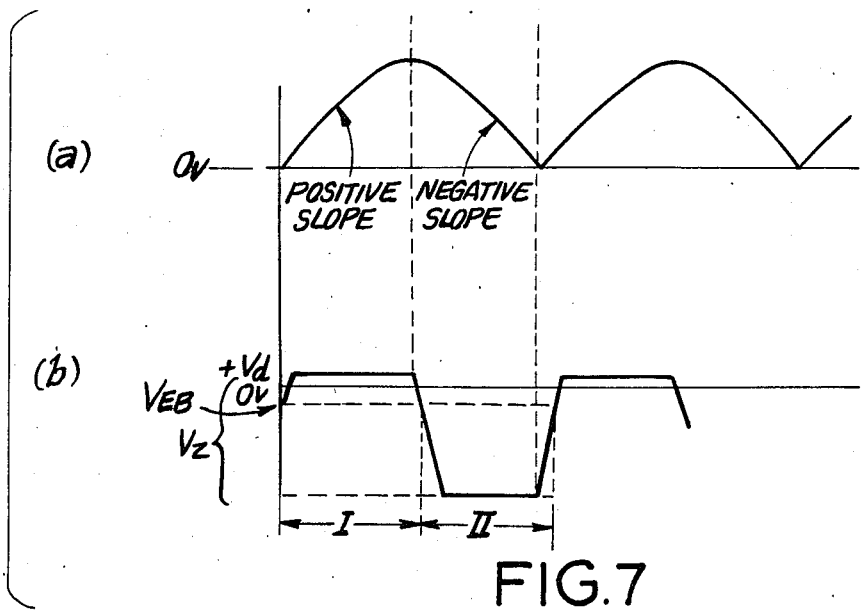
FIG. 7 is a diagram of waveforms associated with the preferred embodiment of the present invention.

The preferred embodiment of the present invention uses an ac-coupled differentiating network for providing a phase shift of about 90 degrees of the reference line voltage or bridge rectified line voltage. The phase shifted waveform has a positive voltage level during the upward slope of the bridge rectified sinusoidal line waveform, a negative voltage level during the downward slope, and about a zero voltage level at the peak of the reference line voltage or of the bridge-rectified line voltage. FIG. 7(a) provides an illustration of the bridge rectified line voltage and FIG. 7(b) provides an illustration of the phase shifted waveform.

A modification to the conventional GFCI configuration to accomplish the phase shifted inhibition of SCR 210, is shown in FIG. 3. The modification includes the addition a PNP transistor 270, resistor 271, zener diode 272 and capacitor 208. The capacitor 208 performs two functions. Its first function is to act as a high frequency filter for spikes and its second function is to act as part of a differentiator which is described in more detail below. The zener diode 272 clamps at a zener voltage level during the negative slope of the bridge output waveform and clamps at a low forward diode voltage drop during the positive slope of this waveform. It is, therefore, conducting at a low impedance for nearly the entire cycle of the bridge voltage of FIG. 7(a). Capacitor 208 in conjunction with the series connected low impedance of the zener diode 272 acts to inhibit transients and surges. If a transient should occur when the line voltage is close to zero and when the zener diode 272 normally would not be conducting, it will be coupled through capacitor 208, thereby raising the voltage level and reducing the impedance of zener diode 272 back to a low level. FIG. 7(a) shows the voltage output waveforms of the bridge 212 and FIG. 7(b) the waveforms at the anode of the zener diode 272.

Since the zener diode 272 has a low impedance in either polarity of conduction, it forms in conjunction with the capacitor 208 a very efficient differentiator, or waveform slope sensitive detector, which is relatively stable with line amplitude variations. As can be seen from FIGS. 7(a) and 7(b), when the power line voltage has a positive slope the voltage across the zener diode 272 goes positive and clamps at its positive diode forward conduction voltage $V_d$. When the supply voltage starts to decrease, i.e., it has a negative slope, the diode voltage starts to go negative until it clamps at its avalanche or zener voltage $V_z$. When the negative voltage is equal to the emitter-to-base threshold voltage of transistor 270 ($V_{EB}$ in FIG. 7(b)), the transistor starts to conduct. This effectively shorts the gate of the SCR 210 to its cathode, thereby preventing the SCR 210 from turning on as long as the transistor 270 is conducting. However, if the SCR 210 has already been firing, the shorting of its gate-to-cathode terminals could not turn off the SCR, since and SCR is designed to extinguish its firing cycle only when its current conduction passes through zero. The resistor 271 limits the base current to the transistor 270 from being excessive.

Another way to look at the function of the circuit is that the waveform of FIG. 7(b) is twice the frequency of waveform of FIG. 7(a). Doubling the frequency enables the system to break the waveform of FIG. 7(a)

into two separate time periods, i.e., a permit firing time I (FIG. 7(b)) and an inhibit-firing time II (FIG. 7(b)).

While the invention has been described in its preferred embodiments, it is to be understood that the words which have been used are words of description, rather than limitation and that changes may be made within the purview of the appended claims without departing from the true scope and spirit of the invention in its broader aspects.

I claim:

1. In a ground fault circuit interrupter of the type having a solenoid with a moveable core that is actuated by the current from a bridge rectifier when a silicon controlled rectifier responds to an imbalance in the power lines to cause a pair of latching contacts to open, the improvement comprising means for inhibiting the operation of the silicon controlled rectifier near the end of a cycle associated with the bridge rectifier, such that the solenoid is not actuated if the electric power associated with the cycle is insufficient to cause the contacts to latch in an open position.

2. An improved detection circuit for a ground fault circuit interrupter of the type having a solenoid with a movable core that is actuated by the current from a bridge rectifier when a silicon controlled rectifier responds to an imbalance in the power lines to cause a pair of latching contacts to open, wherein the improvement comprises means for inhibiting the operation of the silicon controlled rectifier near the end of a cycle associated with the bridge rectifier, such that the solenoid is not actuated if the electric power associated with the cycle is insufficient to cause the contacts to latch in an open position, said inhibiting means including means for comparing the cycle associated with the bridge rectifier to a fixed threshold.

3. An improved detection circuit for a ground fault circuit interrupter of the type having a solenoid with a movable core that is actuated by the current from a bridge rectifier when a silicon controlled rectifier responds to an imbalance in the power lines to cause a pair of latching contacts to open, wherein the improvement comprises means for inhibiting the operation of the silicon controlled rectifier near the end of a cycle associated with the bridge rectifier, such that the solenoid is not actuated if the electric power associated with the cycle is insufficient to cause the contacts to latch in an open position, said inhibiting means including means for comparing the cycle associated with the bridge rectifier to a threshold proportional to the line voltage.

4. A circuit according to claim 3 wherein the threshold of said comparing means is provided by an ac-coupled differentiating network.

5. A circuit according to claim 4 where said ac-coupled differentiating network includes means for generating a waveform having twice the frequency of the cycle associated with the bridge rectifier.

6. A circuit according to claim 4 where the waveform, having twice the frequency of the cycle associated with the bridge rectifier, controls a transistor which shorts the gate of the silicon controlled rectifier.

7. A circuit according to claim 6 wherein said ac-differentiating network includes a transistor, a zener diode connected in series with a capacitor, and a resistor connected between the base of said transistor and the junction of said zener diode and said capacitor.

* * * * *